(No Model.)

E. G. STEVENS.
EYE PROTECTOR OR GUARD.

No. 599,289. Patented Feb. 15, 1898.

WITNESSES
J. W. Dolan
M. Lynch

INVENTOR.
Edward G. Stevens
by his Atty.
Clarke & Raymond

UNITED STATES PATENT OFFICE.

EDWARD G. STEVENS, OF CLINTON, MASSACHUSETTS, ASSIGNOR TO THE MONITOR COMPANY, OF PORTLAND, MAINE, AND BOSTON, MASSACHUSETTS.

EYE PROTECTOR OR GUARD.

SPECIFICATION forming part of Letters Patent No. 599,289, dated February 15, 1898.

Application filed March 27, 1893. Serial No. 467,842. (No model.)

*To all whom it may concern:*

Be it known that I, EDWARD G. STEVENS, a citizen of the United States, residing at Clinton, in the county of Worcester and State of Massachusetts, have invented a new and useful Improvement in Eye Protectors or Guards, of which the following is a full, clear, and exact description, reference being had to the accompanying drawings, forming a part of this specification, in explaining its nature.

The wire frame may be upon the inside or the outside of the protectors or plates, and the protectors or plates, frame, and cushions are preferably secured together in the manner shown.

Figure 1:
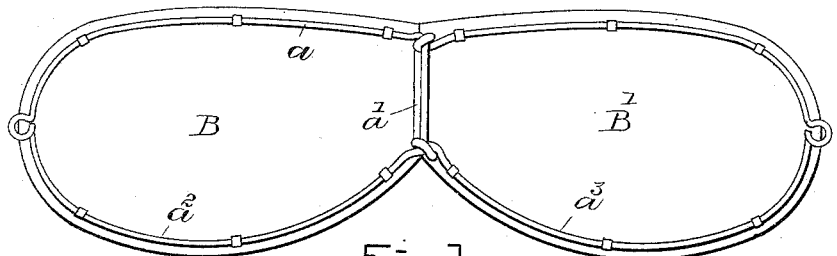
Figure 2:
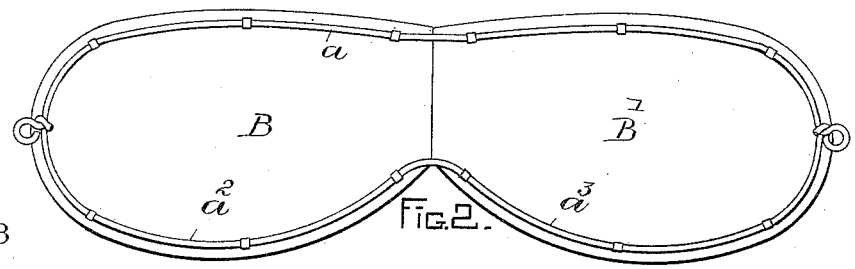
Figure 4:
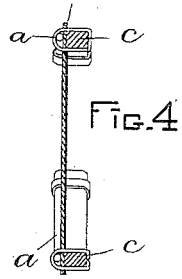
Figure 3:
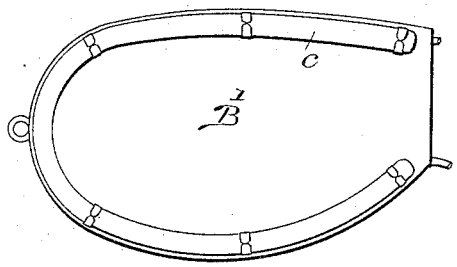
Figure 5:
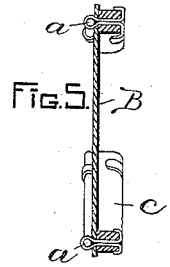
Figure 8:
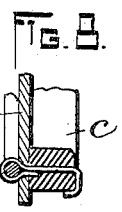
Figure 6:
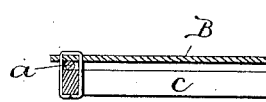
Figure 7:
Figure 9:

Referring to the drawings, Figure 1 is a view in elevation representing an eye guard or protector having a jointed wire frame. Fig. 2 is a view in elevation representing the eye guard or protector having a wire frame without a hinge or practically continuous. Fig. 3 is a view in rear elevation of a part of the protector or guard. Figs. 4 and 5 are sectional views illustrating forms of construction. Fig. 6 shows the wire frame, the protectors, and the cushions secured together. Fig. 7 is a view representing the frame as arranged between the protecting-plates and cushions. Figs. 8 and 9 are detail views of parts of the protector on an enlarged scale.

In the drawings, $a$ represents the frame of the eye protector or guard. It is made, preferably, of small-gage wire or of any other substance that shall produce the same effect as wire—namely, strength combined with lightness, flexibility, and a narrow surface.

The frame $a$ may be in one piece, as represented in Fig. 2, or it may be jointed or hinged at $a'$, as represented at Fig. 1, so that the two parts $a^2$ $a^3$ may be folded outwardly or so as to bring the protecting-plates together.

B B' represent the protecting-plates. They are preferably formed from sheet-mica, and their surfaces may have any desired color or finish. The frame may be upon either side of the plates or protectors. I prefer that it be upon the outside and that the cushion or rest $c$ be upon the inside.

In the drawings I have shown in Fig. 5 the wire frame, the plates, and the cushions as attached together by means of two armed fasteners which straddle the wire, pass through holes in the plates or protectors and through the cushions or rests, and are upset or turned backward upon them.

In Fig. 4 I have shown the wire frame and protecting-plates secured together by fastenings which embrace the wire and have arms which pass through the protectors and about the cushions or rests, preferably extending about their outer and inner sides and having their ends bent onto their outer edge.

Another way of securing the parts together is shown in Fig. 6, where the wire frame, protecting-plates, and cushions are represented as secured together by stitches or loops of thread or wire taken over the wire frame, through the protecting-plates, and over or through the cushions.

It will be observed that the cushions are considerably wider than the frame and that the frame is set in from the edges of the protecting-plates somewhat, so as to bear a central relation to the cushions. In some instances it will be desirable to arrange the frame between the protecting-plate and the cushions, as represented in Fig. 7, in which event the fastenings will secure the protecting-plates and cushions together, and the frame will be interposed between them. When this organization is used, it will be desirable to protect the holes formed in the mica or other plates by providing them with metal rims. This is easily obtained by means of metal eyelets, as shown in Fig. 9, set in the plates in the desired locations.

I would say that wherever holes are formed in the protecting-plates in the passage of fastenings it is desirable that they be eyeleted. I would also say that the fastenings of Figs. 4 and 5 may have one long arm to extend through the cushions and be turned over or upset and one short arm which does not extend through the cushion, as shown in Fig. 8.

Having thus fully described my invention, I claim and desire to secure by Letters Patent of the United States—

1. In an eye guard or protector, the combination with a two-part, light wire frame hinged at its middle, of transparent plates, such as mica, means embracing said frame and passing through said plate at a point removed from the edge for securing said two-part frame and plates together, and cushions or rests attached to the inner surface of said plates, said two-part frame and cushions being slightly smaller than the plates so that they lie wholly within the edges of said plates.

2. In an eye guard or protector, the combination with a flexible wire frame, as $a$, of the transparent plates B of mica or similar substance, the cushions or rests $c$, and connecting devices passing around said frame, through said plates and clamped upon said cushions, the edges of said plates B extending beyond said frame and cushions, substantially as described.

EDWARD G. STEVENS.

In presence of—
F. F. RAYMOND, 2d,
J. M. DOLAN.